United States Patent
Dufournier

(10) Patent No.: US 7,233,237 B2
(45) Date of Patent: Jun. 19, 2007

(54) METHOD AND SYSTEM OR CENTRAL STATION FOR MONITORING TYRE CONDITION, AND FOR DETECTING THE PRESENCE OF CHAINS OR NAILS, ON A VEHICLE

(75) Inventor: Arnaud Dufournier, Clemont-Ferrand (FR)

(73) Assignee: Dufournier Technologies SAS, Cournon d'Auvergne (FR)

(*) Notice: Subject to any disclaimer, the term of this patent is extended or adjusted under 35 U.S.C. 154(b) by 115 days.

(21) Appl. No.: 10/380,700

(22) PCT Filed: Sep. 13, 2001

(86) PCT No.: PCT/FR01/02853

§ 371 (c)(1),
(2), (4) Date: Mar. 25, 2004

(87) PCT Pub. No.: WO02/23152

PCT Pub. Date: Mar. 21, 2002

(65) Prior Publication Data

US 2004/0196149 A1  Oct. 7, 2004

(30) Foreign Application Priority Data

Sep. 15, 2000   (FR) .................................. 00 12065

(51) Int. Cl.
*B60C 23/00* (2006.01)

(52) U.S. Cl. ..................... 340/444; 340/443; 340/445; 73/146.5

(58) Field of Classification Search ............... 340/441, 340/444, 443, 445, 446, 447, 448; 73/145.5, 73/146.2, 146.1; 701/30, 38, 39, 68
See application file for complete search history.

(56) References Cited

U.S. PATENT DOCUMENTS

| | | | |
|---|---|---|---|
| 3,245,213 A | 4/1966 | Thompson et al. | |
| 3,770,040 A | 11/1973 | De Cicco | |
| 3,832,008 A | 8/1974 | Leiber et al. | |
| 4,018,087 A | 4/1977 | Wenz | |
| 4,609,905 A | 9/1986 | Uzzo | |
| 4,815,004 A | 3/1989 | Beebe | |
| 5,218,862 A * | 6/1993 | Hurrell et al. | 73/146.5 |
| 5,524,482 A | 6/1996 | Kushimoto et al. | |
| 5,531,110 A | 7/1996 | Ohashi et al. | |
| 5,569,848 A * | 10/1996 | Sharp | 73/146.2 |
| 6,220,199 B1 | 4/2001 | Williams | |
| 6,420,966 B2 * | 7/2002 | Sugisawa | 340/442 |

FOREIGN PATENT DOCUMENTS

| | | |
|---|---|---|
| FR | 2 399 932 | 3/1979 |
| FR | 2 543 901 | 10/1984 |
| FR | 2 649 043 | 1/1991 |

* cited by examiner

*Primary Examiner*—Anh V. La
(74) *Attorney, Agent, or Firm*—Rothwell, Figg, Ernst & Manbeck

(57) ABSTRACT

A system and method are provided for monitoring the physical integrity of a tire. The system and method include measuring a signal proportional to the speed of rotation of the wheel and calculating a harmonic signal of the round of wheel (e.g., equal to the energies of the harmonics of this signal), then comparing the result with a threshold and activating an alarm when over-passing this threshold.

33 Claims, 4 Drawing Sheets

Figure 1:
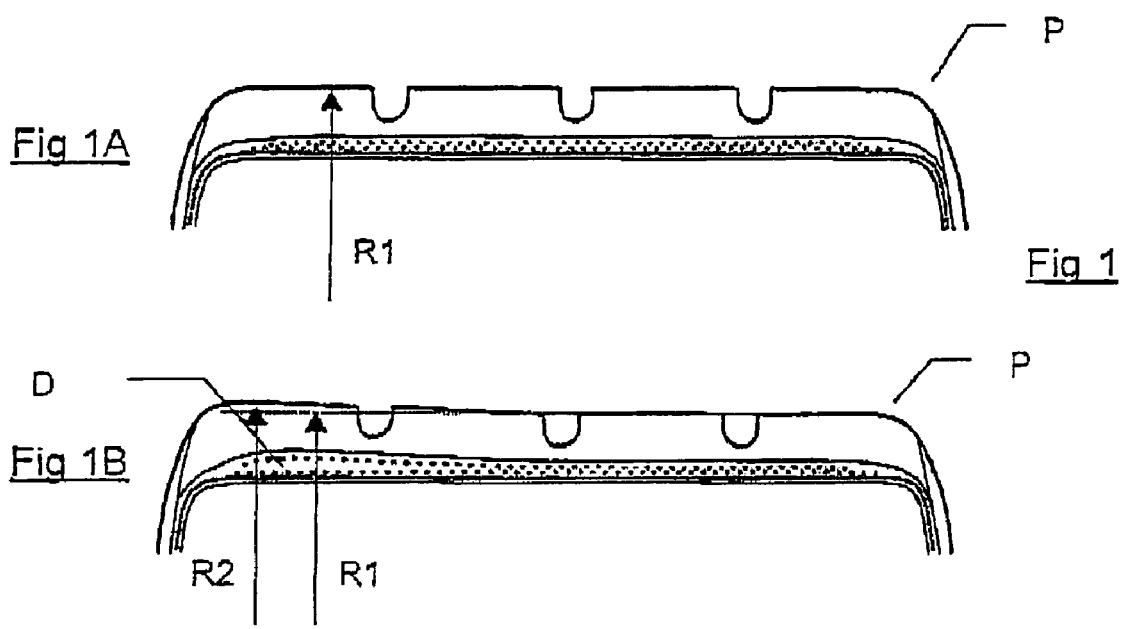

__METHOD AND SYSTEM OR CENTRAL STATION FOR MONITORING TYRE CONDITION, AND FOR DETECTING THE PRESENCE OF CHAINS OR NAILS, ON A VEHICLE__

CROSS REFERENCE TO RELATED APPLICATION

This application is a 35 USC § 371 National Phase Entry Application from PCT/FR01/02853, filed Sep. 13, 2001, and designating the U.S.

TECHNICAL DOMAIN OF THE INVENTION

The present invention concerns the technical sector of motor vehicles, planes and aircrafts, motorbikes, civil engineering machines, trailers, caravans, vehicles for leisure activities called "campers", transport vehicles, renting vehicles, racing vehicles, cycles and in a general way any vehicles or mobile objects, such as airplanes, aircrafts, motorcars, heavy goods vehicles and in a general way vehicle for civil engineering, lift trucks, handling machines, trailers and caravans, and similar, and more specially devices and methods to improve their control, and quite particularly the technical sector of the study of such devices and methods to control their tires.

The expert will understand that the invention applies, in its widened mode, beyond vehicles, to any kind of vehicles and machines, acting on ground or not.

Moreover, the expert will understand that the invention can be implemented on or with or by means of test devices or attempts such as benches with roller, industrial machines on which we want to test the integrity of an element rather in rotation, and analogs.

By simplicity, all that precedes will not necessarily be retailed in what follows, the expert being capable of considering, of operating and of understanding the discriminations or on the contrary the necessary extensions.

Objective

The decays of tires find generally their origin in an exfoliation of the top of the aforementioned tire (tread separation) or in an accidental weakness of the structure constituted by the fabrics of the frame.

The objective of the device consists in detecting these serious weakness, and in supplying the information to the security systems (anti-blocking of brakes, antiskid system, path control) as well as to the driver.

Domain of Application

Any vehicles motorized or not, set with tires or with treads, with the aforementioned type without limitation.

By simplicity, we shall appoint in what follows, by "wheel" any rolling element of a vehicle, equipped or not with tires or treads, tires which can be of any known or future type.

PREVIOUS ART

The gravest decays of tires are generally connected to two types of destructions:
  Accidental weakness of tire structure constituted by the frame and which is characterized by a break and\or an excessive deformation,
  Exfoliation of the top of the tire (unsticking of ply assembly, of the tread or shoulder, or tread or shoulder separation).

Generally, when such phenomena appear, there is a fast propagation of the defect which is characterized by an appearance of strong vibrations of the wheel and an excitement in rotation of this one.

We know a patent deposited in the name of Michelin™ published under the numbers:

FR9808655 and WOEP9904464 and title: method and device of detection of a condition of rolling with flat tire-inserts, wheels and tires were conceived for this method.

Which is a flat-running detector.

We know another system from BMW™ according to which the accelerometers put on the wheels of a vehicle to detect a weakness of suspension or a loss of pressure in a tire.

We know another system from Continental™ which essentially consists in including on the sidewalls of the tire rubber strips loaded with magnetic material, what allows to observe the deformation of radii. This system does absolutely not work on the monitoring of the tire integrity and does absolutely not use the harmonics of frequency.

Today, in spite of the evident need of such a system, no central tire monitoring system exists, the tires which can be at the origin of numerous types of accidents, either affect the functioning of the modern embedded systems as anti-blocking of wheels, path control, etc. For example, if the ABS™ starts on a vehicle whom one of the tires is damaged or deflated, the obtained result will not be in accordance with the foreseen trajectory.

Moreover, one easily conceives that the industry met large difficulties conceiving, or even considering, such a tire monitoring system, because by definition such a system leads to high difficulties such as:

Manufacturing method of the tire definitely not adapted to the insertion of such a system elements Predictable high cost Problems of reliability (the active systems must undergo important thermal effects, accelerations up to 5000 G, shocks being translated by positive or negative accelerations from 10 to 20 g, and similar)

Problem of transmission of data to the vehicle, since the tire is rotating while the chassis of the vehicle is stationary Problem of supplying the system with energy in the tire.

Thus, there is an important and known need for a system allowing to anticipate the decay of a tire and its consequences, to reduce the causes of increasing this decay, and to reach a security domain.

The device proposed allows to identify such advanced decays of the tire by discovering the appearance of characteristic signals by the means of the <<wheel speed>> information, "wheel" being taken by simplicity in the wide meaning indicated above and below in the summary of the invention.

SUMMARY OF THE INVENTION

The process or method, according to the invention, and the system or corresponding device, consists in measuring a signal proportional to the speed of rotation of the wheel (*) and to calculate the energies of this signal corresponding to the harmonics of the wheel round (from the $1^{st}$ to the $64^{th}$ harmonic) then to compare the result with a threshold and to activate an alarm when over passing this threshold.

(*) the expert will understand that, in all the text, one can replace the measurement of the wheel speeds by:

The measurement of speeds or hub accelerations, suspension or even the body

Or by measurements of effort or movement on wheels or elements of the body or the suspensions The overall being called by simplicity <<measurement of the wheel speeds>>.

Indeed, as, during a short time, the vehicle moves at a more or less constant speed, any variation of the wheel speed involves by a relative movement of both the corresponding hub and the elements of suspension and elements of the body. These movements can be measured as a movement, a speed, an acceleration or also a force via the corresponding sensors.

Especially in the case of the use of accelerometer or force sensor, we can, use only one sensor per axle or wheel set which will then be mounted on a representative element of the axle or the wheel set, or a single sensor for the whole vehicle which will be preferentially put then on the body.

The expert will understand that all these measurements, methods, or devices, and their applications, will be included in the general terminology used.

The invention concerns the method which will be described, as well as the corresponding devices, the applications of the method and the devices in any vehicle as defined in the description, and the vehicles using the method or including at least one device in accordance with the invention.

In the description and possibly in the claims, we shall not duplicate pointlessly the description of the method and that of the corresponding devices. The expert will understand that, when we shall have described a "method including a stage consisting in . . . >> this expression also points out devices including <<means to implement the aforementioned stage>>, without useless duplication.

Sometimes, to remind what precedes, we shall indicate <<method or device>> to simplify.

DETAILED DESCRIPTION OF THE INVENTION

A break or an excessive strain of the ply fabrics leads to a radial structural weakness of the tire in the incriminated zone.

This radial weakness leads to a variation of the bearing capacity of the tire in this zone, then there is a variation of the loaded radius when rolling when the deficient zone comes through the contact area (change of the bending), and also at the opposite of the contact area (anti-deflection).

An exfoliation of a part of the summit or the shoulder of the tire leads to an over thickness in the concerned zone.

This over thickness corresponds to an increase of the rolling radius of the tire. It results a variation of the speed of rotation of the wheel, when the defect goes through the contact area.

Such an over thickness is resulting for example from a hernia of the inner tube, a break or a weakness of the steel bead twined (who can relax), a break or a strain of the ply fabrics, or an exfoliation assembly ply/frame fabrics or tread/assembly ply of the tire, for example.

We shall find on the annexed FIG. 1, which includes FIGS. 1A and 1B, a cross section of a normal tire P (FIG. 1A) and on the contrary (FIG. 1B) during a tread separation by exfoliation of ply assembly. We see that the radius R1 of the normal tire increases up to a value of radius R2 (R2>R1) in the zone where the exfoliation appears.

Figure 2:
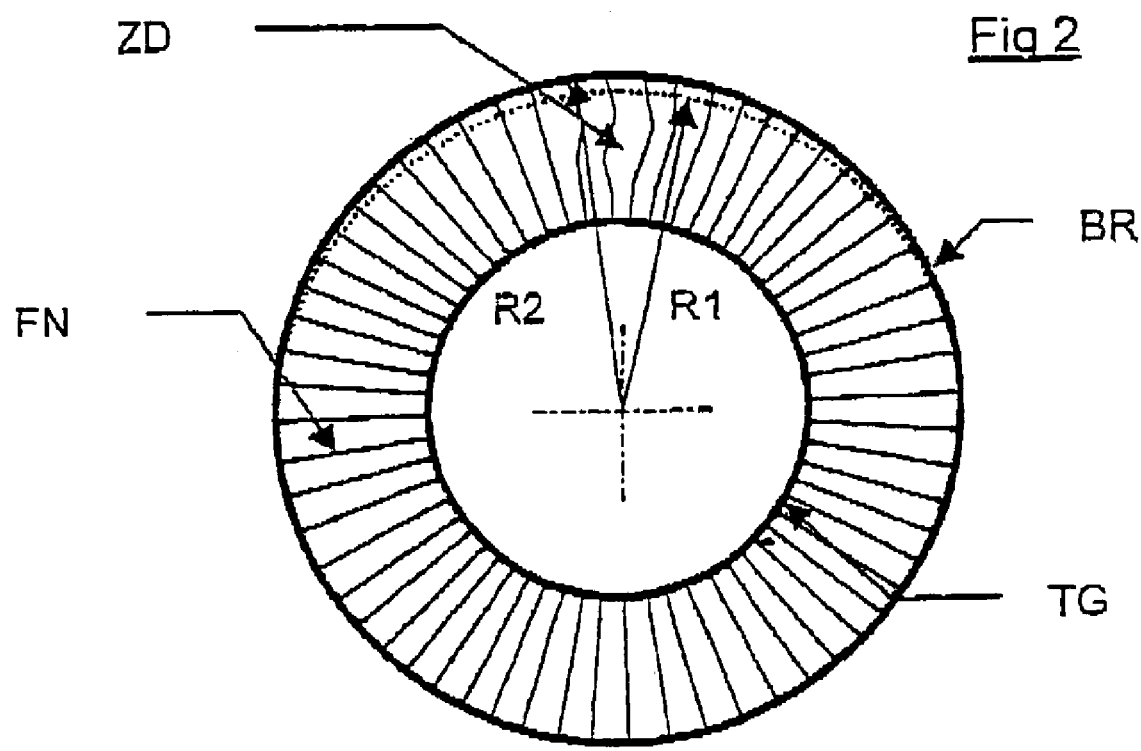

We shall find on the annexed FIG. 2 a sight in section of a tire (tread BR, thread of frame fabrics FN, bead wire TG) having undergone a local strain of her frame fabrics (hernia) in the zone of sidewall ZD.

The types of weaknesses previously quoted thus create variations of the speed of rotation of the wheel. These variations produce a periodic signal of period equal to the round of wheel or to one sub-multiple of this round of wheel (in case of the appearance of several zones of decay or the propagation of the zone of decay).

It was discovered that a general effect which, in a surprising way, is independent from the type of defect (exfoliation, strain, deformation in general, tread separation, tire-rim separation, deficient mounting, bad assembly, bad balancing, break of steel bead, defect of shape, manufacturing defect, flat on the tread, wrenching of rubber etc.): it is about the generation of vibrations harmonic of the wheel round and which can be measured on the wheel, the suspension system or the body of the vehicle.

The invention applies to practically all the types of decays of the tire, and in particular for the most important: exfoliation, strain, deformation in general, tread separation, tire-rim separation, bad assembly, bad balancing, break of bead wire, defect of shape, manufacturing defect, flat on the tread, wrenching of rubber.

The invention concerns on one hand a method for the monitoring of the state of the tires of a vehicle, (and by extension of the use or not of snow chains, of spikes, and the other factors of deformation), characterized in the fact that it consists in measuring a signal proportional to, or representative of (acceleration), the speed of rotation (rolling speed) of the wheel in particular to take into account the presence of any element or cause modifying locally the radius R1 (static or dynamic in particular the loaded radius, that is measured in the area of contact) of the tire or the rolling radius), on the wheel, the suspension system or the body of the vehicle, a signal proportional to the speed of rotation of the wheel, resulting from the generation by the aforementioned defect of harmonic vibrations of the round of wheel and to calculate then a synchronous (or harmonic) information of the wheel speed then to compare the result with a threshold and to activate an alarm when over passing this threshold.

According to a favorite realization mode, the invention concerns a method such as described above and characterized in the fact that it consists in measuring, on the wheel, the suspension system or the body of the vehicle, a signal proportional to, or representative of, the speed of rotation of the wheel, resulting from the generation by the aforementioned defect of harmonic vibrations of the round of wheel.

According to a favorite realization mode, the invention concerns a method such as described above and characterized in the fact that the essential characteristic is a wheel-speed information as the basic signal and to calculate then the energies of this signal corresponding to the harmonics of the wheel round (from the 1st to the 64th harmonic).

According to a favorite realization mode, the proposed method consists in measuring, on the wheel, the suspension system or the body of the vehicle, a signal proportional to the speed of rotation of the wheel, resulting from the generation by the aforementioned defect of harmonic vibrations of the round of wheel.

The essential characteristic consists in measuring an information linked to the wheel speed as the basic signal and the extraction of a synchronous information (or harmonic) of wheel speed. We are then interested in a criteria of scattering of this synchronous or harmonic information of the wheel speed.

This signal can, for example, be measured by the mean of sensors already set on the vehicle (sensors used for the anti-blocking of brake ABS™, antiskid system or path control) or additional such as optical converters, magnetic converters, accelerometers. As knows the expert, the optical or magnetic "converters" are, geometrical elements marked either optically or magnetically, and made to provide a legible code to a sensor). The magnetic converters of the method from Continental™ aforesaid could be used according to the invention, but naturally absolutely not in the same function, nor to resolve the same technical problem.

As the expert will understand without the other explanations and in the reading of the description which precedes, and by the example of treatment which is going to follow, the system according to the invention essentially includes, according to its general mode, the application of an electronic apparatus BO capable of collecting and of processing, thanks to memories and known integrated computers or easily accessible to every expert, signals emitted by the on board electronics apparatus in series or optional (more and more frequently, in series), such as ABS™, antiskid system, path control, and similar, and to deduce by the not restrictive treatment below the state of the tire (and by extension the use or not of snow chains, or spikes, etc.) that is to say the presence of any element or cause locally modifying the radius R1 (static or dynamic in particular the loaded radius, that is measured in the contact area) of the tire or the rolling radius.

According to a favorite realization mode, the device calculates then the energies of this signal corresponding to the harmonic of the wheel round (from the $1^{st}$ to the $64^{th}$ harmonic).

Still according to a favorite mode of realization, the system compares the result with an individual threshold and activates an alarm when the signal overpasses this threshold.

In one preeminently preferred embodiment the process claimed for the invention comprises a stage of "spatial adjustment" of a front wheel and a rear wheel, for example, during calculation of the C % (factor for comparison of the wheel being tested to a reference wheel (or signal standardization)).

The object of this extremely important stage is to make a so-called "iso-ground comparison of the two wheels, that is, coefficient C % incorporating the spatial adjustment (see below) makes it possible to overcome with precision the effects of uneven ground such as bumps, furrows, etc. . . . This point of the process is one of the essential characteristics of application having the aim of achieving the best possible efficiency, that is, this stage is not absolutely mandatory but in many cases will be an essential condition for operation of the device under all conditions, poor ground conditions in particular.

It is also important to note (as a supplement to the spatial adjustment) that, in one preferred embodiment, preferably wheels positioned on one side of the vehicle are taken into consideration.

Here, we shall remind that any defect on the tire is going to create a characteristic frequency of this defect which naturally function of the speed of rotation of the wheel. This frequency includes certain number of harmonics.

It is to be noted that, depending on the speed of rotation of the wheel of the vehicle, the frequency, or at least one of its harmonics, will coincide with the characteristic frequency of the vehicle, for example, around 12 Hz for the vertical mode of vibration of the body, around 40 Hz for the tire itself, and other characteristic frequencies well known to the expert.

The frequency or its harmonic corresponding to the defect is then amplified by the resonance (generally stationary) with which it coincides, the characteristic signal of the defect thus becoming even easier to detect.

It can also be interesting, according to a not restrictive variant of the invention, to compare the sum of a part or all the harmonics with a specific threshold and to activate an alarm if this threshold is over passed.

In another not restrictive variant, thresholds correspond to a function of similar measurements made on all or at least one of the wheels of the vehicle, the entirety of the wheels of the vehicle or the wheel on the same side, the same axle or in diagonal.

In another variant of the device, the basic signal is a signal from an accelerometer measured on the wheel, the elements of suspension or any representative element of the body of the vehicle. Indeed, the variations of rolling radius connected with the tire defect evolves oscillations of the wheel preferentially according to the vertical axis, and also variations of speed according to the longitudinal axis, and still by modification of the barycenter of the forces in the contact area and by the geometry and both the elastics and kinematics properties of the suspension system and the transverse axis of the vehicle.

We can thus discern a constituent of vertical acceleration of the hub of the wheel, a constituent of (horizontal) longitudinal acceleration and a constituent of acceleration in rotation. (We shall notice here that the modification of the barycenter of the forces in the contact area also generates torques following the strut steering axis, the rolling axis of the wheel and the longitudinal axis of the vehicle which can be measured too for example on the steering or the wheel or the elements of suspension or still the body).

The frequencies are known to vary from case to case. The frequency of vertical movement of a wheel axle is of the order of 12 Hz, that of longitudinal movement of the order of 25 Hz, and that of rotary movement of the order to 40 to 60 Hz, depending on the speed. This frequency corresponding to rotary movement makes it possible to acquire the most detailed data.

The frequency or its harmonic corresponding to the defect is accordingly amplified by the resonance (generally stationary) with which it coincides, the characteristic signal of the defect thus becoming easier to detect.

In another variant, the basic signal is a force measurement made on the wheel, and/or on the suspension elements and/or on any representative element of the body of the vehicle (for example a sensor with strain gauge or an accelerometer located on the wheel or the aforementioned element).

Still according to a variant, we can conversely make a measure of the movement of the element of the body, suspension, or the other characteristic element.

In one preferred embodiment use is made of the steering angle to validate/invalidate the results obtained and/or to weight calculation of C % (t) (variation either of coefficient k and/or of the C % (t) factor).

The information of imminent decay of a tire supplied by the device can be made use to inform the driver who can take the appropriate decision as soon as possible. It could also inform the security systems acting on the various wheels (anti-blocking of brakes ABS™, antiskid system, path control) so that they could compensate for the weakness of this tire by balancing their action mainly on all the other wheels.

At present, the security systems receive no information about the integrity of the tire. The action of an ABS™ for example will be identical in the case where the tire is all right or close to the explosion, but naturally the effect of the ABS™ will be drastically different, with a risk of danger.

The information of the driver allows him/her to anticipate the decay and thus reduces considerably the risks of loss of control of the vehicle.

The information of the security systems (such as ABS™ and similar) allows, for example during a braking, not to brake (or to brake less) on the incriminated wheel, to brake slightly on the other wheel of the same axle, to brake more strongly on the wheel situated on the same side than the incriminated wheel, and to brake averagely on the wheel situated on the same diagonal as the incriminated wheel. Such a logic can also be adapted to the other embedded systems such as the antiskid system and the path control, as well as to the future systems of the same category.

The adoption of this type of logic acts upstream to the usual logics by warning the system of a decay largely before it detects by itself, and besides indicates to the system the permanent characteristic of this decay.

Finally, this logic allows to protect the damaged tire by avoiding it undergoing constraints which could increase and accelerate its decay.

The information of decay or degradation can also be supplied to the on board framework, deported device of maintenance or at distance, to supply to the person in charge of the maintenance the required information and possibly the actions to be made.

As the expert will understand, the variants indicated above are not restrictive.

Other characteristics and advantages of the invention will be better understood during the reading of the description which is going to follow, and by referring to the annexed drawing on which:

The FIG. 1, which includes of FIGS. 1A and 1B, represents a cross section of a tire P in normal condition (FIG. 1A) and on the contrary (FIG. 1B) during a tread separation by exfoliation of ply assembly D. We see that the radius R1 of the normal tire increases until a value of radius R2 (R2>R1) in the zone where the exfoliation appears.

The annexed FIG. 2 represents a cross section of a tire (tread BR, thread of frame fabrics FN, steel bead TG) having undergone a local strain of its frame fabrics (hernia) in the zone of sidewall ZD.

Figure 3:
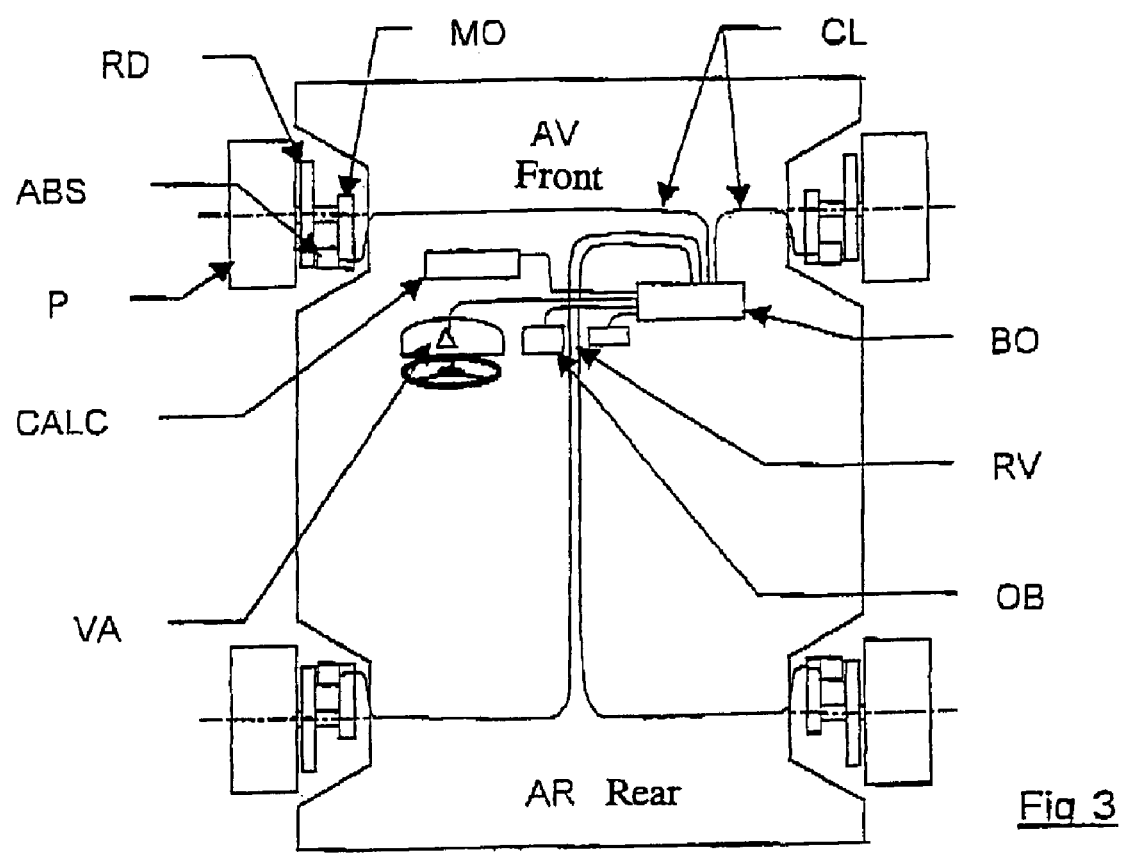

The annexed FIG. 3 represents a not restrictive example of setting-up of the device according to the invention on a generic type of vehicle (which will be described more in detail below as an example)

Figure 4:
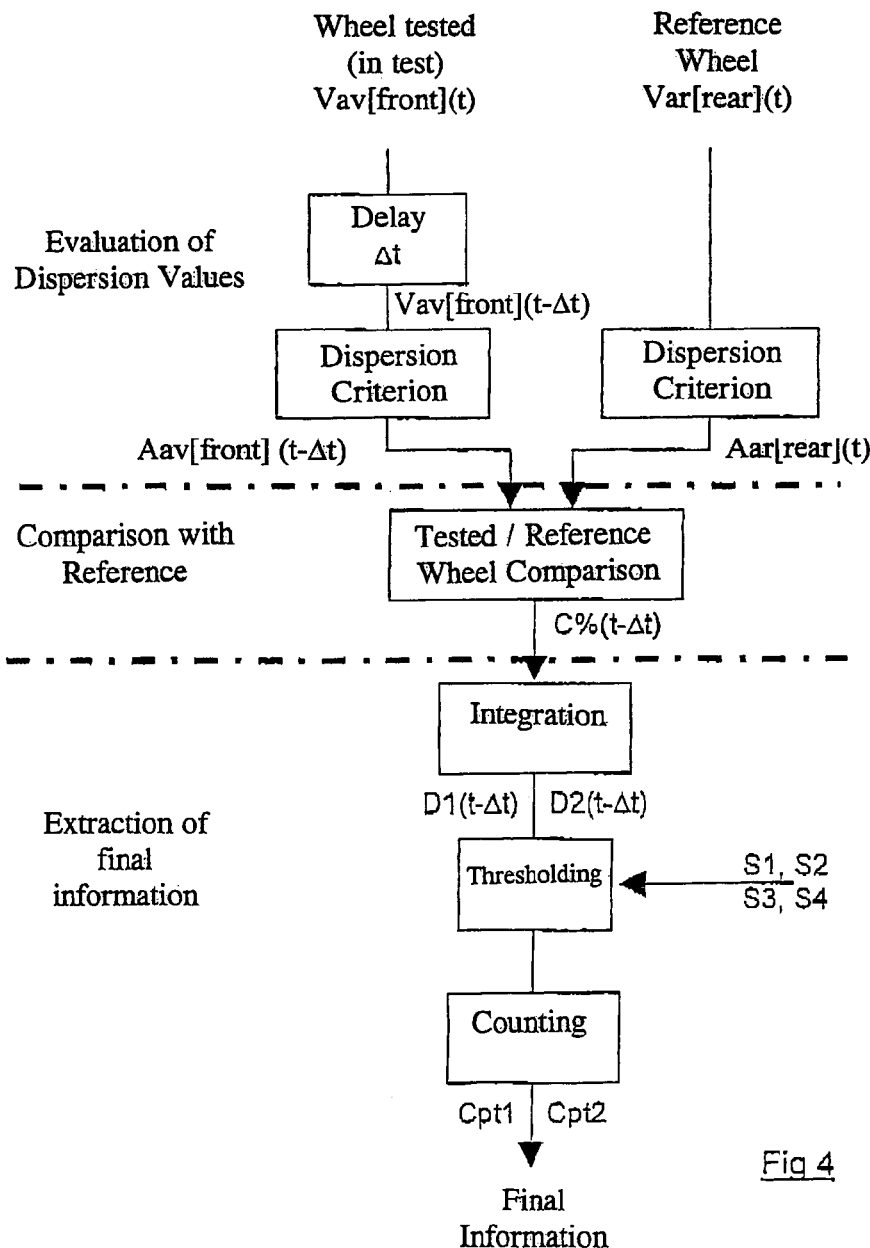

The annexed FIG. 4 represents a synoptic of the general treatment applied to a front wheel under test with a reference allowing the comparison and taken on the back wheel on the same side.

EXAMPLES

Example of Setting-Up on a Generic Vehicle

Such a not restrictive example is represented in broad outline on the annexed FIG. 3.

The references have the following meanings:

| | |
|---|---|
| RD | toothed wheel |
| ABS | ABS ™ sensor (anti blocking of wheels) |
| P | tire |
| CALC | ABS ™ electronic and processors, path control, antiskid system |
| VA | warning light for the driver (and/or sound system) |
| MO | hub of wheel |
| CL | electric cablings |
| BO | case of conditioning and processing of the tire monitoring device |
| RV | cruise control |
| OB | on board computer |
| AV, AR | front, rear |

Description of the general mode:

As we see it, and as will understand the expert without any other explanations and in the reading of the description which precedes, and by the example of treatment which is going to follow, the system according to the invention essentially includes a central unit BO capable of collecting and of processing thanks to memories and known (or easily accessible to every expert) integrated processors, signals emitted by the on board in series or optionally embedded electronics (more and more frequently, equipped in series), such as ABS™, antiskid system, path control, and similar, and to deduce by the not restrictive treatment below the state of the tire (and by extension the use or not of snow chains, or spikes, etc.) that is to say the presence of any element or cause locally modifying the radius R1 (static or dynamic in particular the loaded radius, that is measured in the contact area) of the tire or the rolling radius.

In one preeminently preferred embodiment an effort is made during the first stage to achieve almost absolute accuracy, which in reality is limited by the precision of the sensor or sensors, by measuring the "wheel" speed by a method in which an event associated with the wheel, specifically, its rotation, is taken as the basis and the same event is studied precisely one revolution later, which event may be a specific wheel azimuth and the like, or again, if use is made of gear wheel by a conventional method, in place of a conventional "tooth to tooth" measurement (that is, a single interval between two consecutive teeth), measurement is made of "a single tooth one revolution later," this permitting, the more this measurement is carried out, "one revolution later" for each tooth no. 1, then no. 2, etc, as many highly precise measurements per revolution of the wheel as there are teeth, for example, 48 or 64. This results in extraordinarily high accuracy of measurement.

Exemplary Embodiment

Development Vehicle: Rover™ 75

The sensors already present on the vehicle, ones made by Siemens Automotive™ and used for the Bosch™ ABS™ (Antilock Braking System), are used for measurement of the wheel speeds.

The signals emitted by these sensors are then sent to a central housing mounted near the ABS™ computer.

This central housing comprises two electronic stages:

The analog stage, which processes the input analog and digital signals, contains the feed card and the output signal processing card (analog signals to the dashboard, digital signals carrying information on the condition of the tires)

The digital stage, embodied in an 8-bit microcontroller which performs all processing.

The signals emitted by the wheel speed sensors are initially processed by the analog input stage in order to be digitized and utilized by the digital processing stage.

On the basis of these data as a whole the digital processing stage evaluates the dispersions by means of an algorithm making use of the Hadamard conversion in particular (it eliminates data storage and multiplication or addition operations too complex for an 8-bit microcontroller) applied to the phase shift signal (processing applied only to the module and phase elimination).

It then calculates the deterioration criteria and extracts the final data by means of two parameters emitted by counters (Cpt (1), Cpt (2).

The final data are displayed on the dashboard by means of a pictograph which remains unlit in the absence of detection, which blinks when slow detection has occurred (counter Cpt (2)) and which is constantly red when rapid detection has occurred (counter Cpt(1)).

The counters are configured to revolve between 0 and 255.

If one of these two counters exceeds 192, an indicator made up of an electroluminescent diode and a pictograph, such as the one provided below, introduced into the dashboard, lights up. It is extinguished again only when the counter reading drops below 173. The difference between the lighting value and the extinction value makes it possible to prevent disagreeable flashing of the diode when the condition changes.

This information is supplied simultaneously to a speed regulator which has been modified to modulate its speed as a function of the indication of deterioration and to the ABS.

Example of Treatment

1. The device measures permanently the rotation speeds Vroue (t) each of the wheels.

This measurement can be made for example thanks to the sensors and conditioning used for devices anti-blocking of wheels or antiskid system.

2. It calculates for every wheel a criteria A(t) which can be for example:
   the derivative or variations of Vroue(t) (image of the angular acceleration of the front wheel relative to the rear wheel) and/or
   the standard deviation of Vroue(t) (standard deviation of the speeds of rotation of the front wheel relative to the rear wheel) and/or
   the min or max deviation of Vroue(t) (min-max variation of the speed of rotation of the front wheel relative to the rear wheel) and/or
   The instantaneous speed of the wheel Vroue(t) and/or
   Any criterion of measurement of dispersion of variation of Vroue(t) and/or
   The mean speed of the wheel over a period T.

Or in the power spectrum of the distribution of the speeds of rotation of every wheel:
   The energy on a part or the entirety of the harmonics 1 to 64 of Vroue (t) (we use rather frequency bands centered on the harmonics and width appreciably lower than 10 Hz) and/or
   The energy on one or several frequency bands of Vroue (t) rather included between 1 and 400 Hz.

Use may also be made of the phase variations of Vroue(t) with the following, for example, adopted as criteria:
   the evolution of the phase of Vroue(t) and/or
   the standard deviation of the phase of Vroue(t) and/or
   the min-max deviation of the phase of Vroue(t) and/or
   Any criterion of dispersion or variation of the phase of Vroue(t) and/or
   The phase of evolution of Vroue(t) over part or all of harmonics 1 to 64 (use is to be made preferably of the frequency bands centered around the harmonics and of a width appreciably lower than 10 Hz) or, again, the mean phase over one or more frequency bands ranging preferably from 1 to 400 Hz.

We shall also can in all the criteria of calculation of A (t) described above replace Vroue (t) by its time derivative (the angular acceleration of the wheel).

This coefficient can also be balanced by a constant value or a function of Vroue to take into account technological differences of the various trains.

The formula used for the calculation of A (t) can depend on the speed of the vehicle, and too, on the level of excitement of the ground (information which can be supplied for example. by the sensors on the suspension system used to measure the inclination of the vehicle or for the suspensions and controlled shock absorbers) if this information is available.

Remark:

In case where the basic information would be obtained by sensors others than the sensors of wheel speed, the scan of the harmonics or of the phase will be made, rather, either by autocorrelation of the basic signal, or by convolution with a representative signal of the speed of the wheel or the average speed of a set of wheels of the vehicle. This last signal can result for example from the speed information available on all vehicles or the wheel speeds sensors used for the ABS™.

3. It calculates a comparison coefficient C %

$$C\% = [Art - k \times Ac - r]/Ac$$

Art corresponds to the under test wheel.

Ac corresponds to one of the other wheels, or to the average of the other wheels or some of all the wheels of the vehicle.

k is a coefficient which if desired permits allowance for distribution of the engine or braking system torque between the wheels compared, but also for the load, the differences between tires and pressure differences, for the comparative technological differences of the chassis, or, again, for the steering lock angle (the distances traveled by the wheels while turning apart from any skidding), or also for specific equipment (such as snow chains).

r is a coefficient which permits allowance for the resistance to rolling associated with the tires, the ground contact elements, and the chassis adjustments.

In a preferential design, Ac can correspond to a wheel or a set of wheels located on the same side of the vehicle, each of the wheels being taken in the same spatial mark.

For example:

In the case of a wheel undergoing testing (a front wheel or rear wheel, for example) in comparison to a reference wheel (a front wheel or rear wheel, for example), the function will be:

$$C\%(t) = [Av(t) - k \times Ar(t+\Delta t) - r]/Ar(t+\Delta t)$$

in which

Av corresponds to the wheel undergoing testing (front wheel or rear wheel, for example)

Ar corresponds to the reference wheel (front wheel or rear wheel, for example)

e is the distance between the wheel undergoing testing and the reference wheel along the longitudinal axis of the vehicle (=wheel base in the case of a front wheel in comparison to a rear wheel)

$$\Delta t = e/V$$

where V=speed of advance of the vehicl

V being calculated, for example, on the basis of the mean speed of the non-driving wheels or of the mean speed of the set of wheels, In the case in which the wheel undergoing testing is compared to a reference wheel, these wheels are "spatially adjusted" one relative to the other, that is, referred for purposes of comparison to a single point situated on the longitudinal axis of the vehicle, In the event of comparison with a set of wheels, each of the front tires is to be adjusted in space before the criterion C % is calculated.

The stages 1 and 3 above are the main stages of the method.

The stages 4 and 5 below are less important and not restrictive (examples of extraction of the final information).

4. Two values D1 (t) and D2 (t) are calculated and are used to allow on one hand a reactive follow-up of the evolution of a fast degradation and on the other hand an accurate follow-up of the evolution of a slow degradation.

$$D1(t) = \int_{x=t-T1}^{x=t} C\%(x)\,dx$$

$$D2(t) = \int_{x=t-T2}^{x=t} C\%(x)\,dx$$

in which T1<T2

Order of magnitude:

T1: several fractions of seconds to several seconds

T2: several seconds to several hours

Note: In the application and to simplify calculation use is to be made, in place of the integrals, of sliding totals of the successive values of C % over numbers of periods corresponding more or less to x periods T1 and T2.

5. Extraction of the final information

D1 and D2 is then compared with respective thresholds: S1 and S2 on one hand and S3 and S4 on the other hand.

These tests are followed by counters which increment and decrement according to the results of the tests.

The counters Cpt1 and Cpt2 supply the following information:

Cpt1 is made to look at a fast and important degradation

Cpt2 is made to look at a weak degradation with a slow evolution.

Not Restrictive Example of Method Allowing to Simplify the Treatment

In a variant allowing to simplify the treatment, the $3^{rd}$ stage will not be made what means taking for formula for C %:

$$C\%(t) = A(t)$$

Not Restrictive Examples of Methods Allowing to Improve the Sharpness of Detection Knowledge of the steering angle may be used in evaluation of the wheel speed comparison coefficient k and even as a supplementary factor allowing weighting of C % (t). The steering angle may also be used to invalidate measurements beyond a maximum deflection angle. The results of measurement are then considered to be nonexistent over the entire period during which the maximum angle is exceeded, the counters Cpt(1) and Cpt(2) then remaining unchanged.

Knowledge of the steering angle may be obtained on the basis of data already available for certain devices such as electronic stability control.

During the braking phases knowledge of the braking torque and/or its distribution permits improvement in extraction of final data by weighting the coefficients S1, S2, S3, and S4 as a function of such elements.

This knowledge may be obtained on the basis of the braking pressures and their distribution per wheel. If a brake effort proportioning system is used, the braking torque actually applied to each wheel, on a curve in particular, is to be taken into account. This permits refined evaluation.

During the phases in which engine torque is applied, knowledge of the engine torque and/or its distribution permits improvement in extraction of final data by weighting the coefficients S1, S2, S3, and S4 as a function of such elements.

The engine torque is measured or evaluated on the basis of engine computer parameters, the engine torque Cm applied to the driving wheels.

The evaluation may be made on the basis of the following measurements or data:

accelerator pedal position or injection output, engine speed, transmission ratio (or calculation of this ratio on the basis of the mean speed of the driving wheels and the engine speed)

If a torque distributor (a remote-controlled differential, for example) is used, the torque actually applied to each wheel, on a curve in particular, is to be taken into account). This permits refined evaluation.

Knowledge of the load distribution and/or distribution of the total load of the vehicle makes it possible to improve extraction of the final data by weighting the coefficients S1, S2, S3, and S4 as a function of such elements. Such knowledge may be provided, for example, by the body height sensors used in particular to adjust the headlights.

Knowledge of the dynamic load on the wheel makes it possible to improve extraction of the final data by weighting the coefficients S1, S2, S3, and S4.

Knowledge of the dynamic load on the wheel may be evaluated, for example, on the basis of an inertial unit and/or sensors introduced into the ground connection and used especially for control of the shock absorbers and suspension.

Knowledge of the outside air humidity makes it possible to improve extraction of the final data by weighting the coefficients S1, S2, S3, and S4.

Such knowledge may be obtained, for example, by means of rain sensors used, for example, for remoter control of the windshield wipers.

Knowledge of the outside temperature makes it possible to improve extraction of the final data by weighting the coefficients S1, S2, S3, and S4.

Such knowledge may be obtained, for example, by means of the temperature sensors frequently installed on vehicles.

Knowledge of the inside temperature of the tire casing (temperature of the tire or of the enclosed air) makes it possible to improve extraction of the final data by weighting the coefficients S1, S2, S3, and S4.

Such knowledge may be obtained, for example, by means of temperature sensors installed in the wheels.

Knowledge of the inside pressure of the tire casing makes it possible to improve extraction of the final data by weighting the coefficients S1, S2, S3, and S4.

Such knowledge may be obtained, for example, by means of pressure sensors installed in the wheels.

Thresholds S1, S2, S3 and S4 can also be weighted by the average speed of the vehicle.

Thresholds S1, S2, S3 and S4 can be also weighted by a signal resulting from the group or from a few of the wheels of the vehicle. We shall quote in not restrictive way: the derivative or the variations either dispersal of Vroue (t) or of its module or its phase

Detector of Use of Snow Chains or Spikes or Similar Devices

A variant of application of the invention, leads to a Detector of use of snow chains and/or either of spikes or similar device allowing to improve the mobility.

Objective

To detect the use of chains, spikes or devices equipping tires or wheels and made to improve the mobility of vehicles on ground covered with snow and/or icy.

Valorize this information thanks to other embedded systems: (cruise control, safety system and behavior assistance such as the ABS™, the antiskid system and the path control, or controlled shock absorbers)

Have this valorizable information within the framework of the projects articulated around the concept of " intelligent road " such as AIDA™ to automate the messages of obligation or ban this type of equipment according to the type of road taken, the weather and the legislation.

To advise the driver as for the opportunity to use snow chain, spikes etc. according to the contextual diagnosis (adhesion, temperature) made by the on board computer while driving.

Domain of Use

Any vehicles powered or not, equipped with tires or treads, with the type described previously without limitation.

Summary

The use of snow chains, of spikes or other special similar devices, corresponds to the necessity of road holding in hard conditions, but can also perturb the functioning of security systems and behavior assistance such as the anti-blockings of brakes, antiskid system, shock absorbers controllers and path control etc. . . .

Besides, their use corresponds to a specific legislation: license or ban, limitations of use.

The proposed device detects the use or not of snow chains, of spikes or similar device on the vehicle and so allows to optimize the behavior of the safety systems and behavior assistance, to advise the driver on the opportunity to use chains, to help the driver to respect the particular legislation corresponding to this type of equipment.

We shall appoint in what follows, by simplicity, by <<snow chain>> any device such as snow chains, spikes or any equivalent device allowing to have a mobility increased in precarious conditions and any known or future type.

Advantages

- to optimize the behavior of the safety systems and behavior assistance by informing them about the use of chains.
- to advise the driver via the on board computer as for the opportunity to put or to remove this type of equipment according to the contextual diagnosis (adhesion, temperature) while driving.
- to help the user to respect the particular conditions linked to the use of snow chains and equivalent devices.
- to reduce the damage of roads and chains induced by the practice of an excessive speed (>legal speed),
- to supply a complementary service to the users within the framework of the projects of intelligent or communicating road.

Description

Principle

During the rolling of a vehicle on road, chains or devices allowing to improve the mobility give a very specific shape to the wheel.

This shape is a function of the geometry and the arrangement of chains or of the used device (radial, alveolar, with a variable number of hoops).

The principle of detection is based on a general effect independent from the type of used device: the generation of harmonic vibrations of the wheel round and which can be measured on the wheel, the suspension system or the body of the vehicle.

Then the detection can be made either by mean of sensors of wheel speed used for the ABS™, or by means of one or several accelerometers or strain gauges put on the suspension system or the body.

We shall notice that the intensity of the created vibrations allows to reduce in numerous cases the number of the sensors taken on the body and to work with a unique sensor for the whole vehicle.

Processing

The processing is identical to the one exposed previously.

Nevertheless, a rather global criteria for the function A (t) such as the dispersal of the speed signals (for example the standard deviation of the signals measured on one or some wheel rounds) is generally largely sufficient to reach a satisfactory level of detection.

With the aim of improving the sensibility of the system, the criteria will consist in adding the energies of the signals centered around the harmonics of the wheel round.

In a specific variant, chains will be conceived to emit a specific vibratory signature (for example harmonic of the wheel round on one or harmonics included between the $1^{st}$ and the $64^{th}$), the detection is then preferentially made on generated harmonics. However, the first aforementioned criteria can generally work again in this last case.

The invention also covers all the modes of realization and all the applications which will be directly accessible to the expert in the reading of the present demand and his own knowledge.

The invention claimed is:

1. A method for identifying a defect in the physical integrity of a tire on a vehicle, comprising steps of:
   measuring a signal that is proportional to the speed of rotation of the tire to be monitored;
   calculating harmonic information from said signal;
   comparing the calculated harmonic information to a threshold; and
   identifying that a defect exists in the physical integrity of the tire when the threshold is exceeded by the calculated harmonic information.

2. The method according to claim 1, wherein said measuring step includes measuring a signal that is proportional to the speed of rotation of the tire resulting from generation of harmonic vibrations from the turn caused by a deforming element or by a damaged part of the tire.

3. The method according to claim 1, wherein the step of calculating harmonic information includes calculating energies of the measured signal corresponding to the harmonics from the turn of the tire, from the fundamental harmonic to the harmonic of order 64.

4. The method according to claim 1, wherein the measuring step measures speed of a vehicle hub, suspension, or chassis, acceleration of the vehicle, or a load on, acceleration or displacement of the tire or elements of the chassis or suspension of the vehicle.

5. The method according to claim 1, wherein an accelerometer or load sensor is used per axle or set of tire, and is mounted on a representative element of the axle or set of tires.

6. The method according to claim 1, further comprising steps of:
collecting and process signals that are output by on-board electronics to deduce therefrom a condition of the tire that would locally alter the radius R1 of the tire.

7. The method according to claim 1, further comprising steps of:
calculating a factor of comparison of the tire being monitored with a reference tire in order to eliminate effects caused by unevenness of the ground.

8. The method according to claim 7, wherein tires situated on a same side of a vehicle are compared is the calculating a factor step.

9. The method according to claim 1, further comprising a step of summing two or more harmonics from said harmonic information and comparing the sum to the threshold.

10. The method according to claim 1, wherein the measuring a signal step includes measuring an accelerometric signal measured at one of the tire, one or more suspension elements of the vehicle, or an element representative of a chassis of the vehicle.

11. The method according to claim 1, wherein the measuring a signal step includes measuring at least one of a load applied to the tire, a load applied to suspension elements of the vehicle, and a load applied to any element representative of a chassis of the vehicle.

12. The method according to claim 1, wherein the measuring a signal step includes measuring displacement of a chassis element of the vehicle or a suspension element of the vehicle.

13. The method according to claim 1, further comprising a step of measuring a steering angle of the vehicle and validating the results of the comparison based on the measured steering angle.

14. The method according to claim 1, further comprising a step of transmitting an alarm to one of a driver of the vehicle and a safety system of the vehicle, when a defect is identified.

15. The method according to claim 1, further comprising steps of:
measuring the speed of rotation of each of tire of the vehicle continuously; and
for each tire, calculating a criterion A(t) based on variation of the speed of rotation of the tire.

16. The method according to claim 1, wherein the measuring step includes measuring the speed of rotation of each of tire of the vehicle continuously, and said method further comprises a step of:
for each tire, calculating a criterion A(t) based on measurement of the energy of the signal on frequency bands that are centered on a portion of harmonics 1–64 of the speed of rotation.

17. A device for monitoring the physical integrity of a tire of a vehicle, comprising:
means for measuring a signal that is proportional to a speed of rotation of the tire;
means for calculating harmonic information on the speed of the tire based on the measured signal; and
means for comparing the harmonic information to a threshold and identifying that a defect in the physical integrity of the tire exists when the threshold is exceeded.

18. The device according to claim 17, wherein said means for measuring measures a signal that is proportional to the speed of rotation of the tire resulting from generation of harmonic vibrations from the turn of the tire by a deforming element or a damaged part of the tire.

19. The device according to claim 17, wherein the means for calculating harmonic information calculates energies of the measured signal corresponding to the harmonics from the turn of the tire, from the fundamental harmonic to the harmonic of order 64.

20. The device according to claim 17, wherein the means for measuring measures speed of a vehicle hub, suspension, or chassis, measures acceleration, or measures load on or displacement of the tire or elements of the chassis or suspension.

21. The device according to claim 17, wherein said measuring means includes an accelerometer or load sensor.

22. The device according to claim 17, further comprising means for collecting and process signals that are output by on-board electronics to deduce therefrom a condition of the tire that would locally alter the radius R1 of the tire.

23. The device according to claim 17, further comprising means for calculating a factor of comparison of the tire being monitored with a reference tire in order to eliminate effects caused by unevenness of the ground.

24. The device according to claim 23, wherein said means for calculating a factor compares tires situated on a same side of a vehicle.

25. The device according to claim 17, further comprising means for summing two or more harmonics from said harmonic information and comparing the sum to the threshold.

26. The device according to claim 17, wherein the means for measuring measures an accelerometric signal at a tire of the vehicle, at one or more suspension elements of the vehicle, or at an element representative of a chassis of the vehicle.

27. The device according to claim 17, wherein the means for measuring a signal step measures at least one of a load applied to the tire, a load applied to suspension elements of the vehicle, and a load applied to any element representative of a chassis of the vehicle.

28. The device according to claim 17, wherein the means for measuring a signal measures displacement of a chassis element of the vehicle or a suspension element of the vehicle.

29. The device according to claim 17, further comprising means for measuring a steering angle of the vehicle and validating the results of the comparison based on the measured steering angle.

30. The device according to claim 17, further comprising means for transmitting an alarm to one of a driver of the vehicle and a safety system of the vehicle when a defect is identified.

31. The device according to claim 17, further comprising:
means for measuring the speed of rotation of each of tire of the vehicle continuously; and
means for calculating, for each tire, a criterion A(t) based on variation of the speed of rotation of the tire.

32. The device according to claim 17, wherein the means for measuring measures the speed of rotation of each of tire of the vehicle continuously, and said device further comprising:

means for calculating, for each tire, a criterion A(t) based on measurement of the energy of the signal on frequency bands that are centered on a portion of harmonics 1–64 of the speed of rotation.

33. The device according to claim 17, wherein the means for identifying a defect identifies a defect from a group consisting of: exfoliation, strain, deformation, tread separation, tire-rim separation, deficient mounting, bad assembly, bad balancing, bread of a steel bead, defect in tire shape, manufacturing defects, flat on the tire tread, and wrenching of rubber.

* * * * *